(12) United States Patent
Hönemann et al.

(10) Patent No.: US 6,273,226 B1
(45) Date of Patent: Aug. 14, 2001

(54) HYDROKINETIC TORQUE CONVERTER

(76) Inventors: Rudolf Hönemann, Schwarzwaldstrasse 44, 7833 Ottersweier (DE); Thomas Heck, Friendsville Rd. 3783; Steven Olsen, 1932 Blair Blvd., both of Wooster, OH (US) 44691

( * ) Notice: Subject to any disclaimer, the term of this patent is extended or adjusted under 35 U.S.C. 154(b) by 0 days.

(21) Appl. No.: 09/481,657

(22) Filed: Jan. 11, 2000

(30) Foreign Application Priority Data

Jan. 12, 1999 (DE) .............................................. 199 00 861

(51) Int. Cl.[7] ..................................................... F16D 33/00
(52) U.S. Cl. ........................ 192/3.29; 192/212; 29/509; 29/521; 403/274
(58) Field of Search ................................. 192/3.28, 3.29, 192/212; 29/505, 509, 521, 510; 403/274

(56) References Cited

U.S. PATENT DOCUMENTS

| | | | |
|---|---|---|---|
| 4,577,737 | 3/1986 | Niikura et al. | 192/0.032 |
| 5,029,087 | 7/1991 | Cowan et al. | 364/424.1 |
| 5,752,894 | 5/1998 | Fischer | 477/169 |
| 5,762,172 | * 6/1998 | Tsukamoto et al. | 192/3.29 |
| 5,879,253 | 3/1999 | Friedmann et al. | 474/18 |
| 6,056,092 | * 5/2000 | Hinkel | 192/3.29 |
| 6,056,093 | * 5/2000 | Hinkel | 192/3.29 |
| 6,068,096 | * 5/2000 | Morita | 192/3.29 |

* cited by examiner

Primary Examiner—Charles A Marmor
Assistant Examiner—Saul Rodriguez
(74) Attorney, Agent, or Firm—Alfred J. Mangels

(57) ABSTRACT

An improved apparatus and method for assembly of a hydrokinetic torque converter which comprises a hydraulic pump, a turbine, a stator, a driven hub, and a housing that is driven by the output element of an engine of a motor vehicle, and which functions to transmit torque to the hydraulic pump is disclosed. In such a torque converter the housing is coaxial with the pump and the turbine, and further defines an interior chamber, which encloses the turbine as well as a bypass or lockup clutch cooperating with a torsion damper having an input member and an output member. The present invention provides a positive interlocking connection between the output member of the torsion damper and the driven hub of the turbine by forming a circumferential array of staked protuberances in the driven hub to compressively engage a mating circumferential serration formed in the output member to prevent axial rotation thereof Thus, the inherently complex manufacturing processes required to form the internal and external splines conventionally utilized to interlock such components are eliminated thereby reducing the manufacturing costs of the torque converter. In addition, other components of the torque converter cooperating with the torsion damper are integrated into a single component to reduce space requirements of the torque converter.

13 Claims, 4 Drawing Sheets

HYDROKINETIC TORQUE CONVERTER

CROSS-REFERENCE TO RELATED APPLICATION

This Application claims foreign priority benefits under 35 U.S.C. §119(a–d) to German patent application 199 00 861.2, filed Jan. 12, 1999 by inventors, Rudolf Hönemann, Thomas Heck, and Steven Olsen for an invention entitled Hydrodynamischer Drehmomentwandler ("Hydrokinetic Torque Converter").

BACKGROUND OF INVENTION

1. Field of Invention

This invention relates to improvements in apparatus for transmitting torque in power trains by way of a hydrokinetic torque converter which is equipped with a bypass or lockup clutch and, more particularly, to improvements in transmitting torque by way of a hydrokinetic torque converter which can transmit torque by way of a turbine and/or by way of a bypass or lockup clutch constructed and assembled to operate in parallel with such turbine. Still more particularly the present invention relates to an improved apparatus and method utilized in the construction and assembly of such a torque converter, which reduces the complexity, the weight, the space requirements, and manufacturing costs of the torque transmitting apparatus.

As a general rule, a hydrokinetic torque converter which can be utilized in accordance with the present apparatus and method comprises an impeller or hydraulic pump, a turbine, a stator, and a housing, which is driven by the rotary output element of a prime mover (such as the engine of a motor vehicle), and serves to transmit torque to the hydraulic pump. The housing is coaxial with the pump and with the turbine and defines an interior chamber, which accommodates the turbine as well as a bypass clutch or lockup clutch cooperating with a torsion damper including an input element and an output element whose torque capacity (i.e. the maximum torque which the damper can transmit) is less than the nominal (i.e. maximum achievable) torque of the prime mover. The damper prevents the transmission of any appreciable oscillations of torque from the output element of the engine of the motor vehicle to the input shaft of the transmission while the motor vehicle is operated within the main driving range.

The bypass clutch or lockup clutch serves merely to operate with slip in order to compensate for peaks of oscillations of the torque that is being transmitted by the output element of the engine. When the operation of the motor vehicle is within the main driving range as well as when the bypass clutch is operated with slip, undesirable fluctuations of torque cannot be transmitted to the input element of the transmission by the expedient of reducing the magnitude of the torque which can be transmitted by the clutch. Such pronounced fluctuations of torque are likely to develop, for example, due to resonance, to an abrupt change of the load and/or for certain other reasons.

Such a bypass or lockup clutch can include a friction clutch having a first friction surface on a substantially radially extending portion of the housing and a second friction surface provided on an axially displaceable piston which is movable in the direction of the turbine to move its friction surface into or away from frictional engagement with the first friction surface such that the magnitude of torque, which the clutch can transmit, depends on the extent of frictional engagement between the first and second surfaces. The second friction surface is normally provided on a radially outer portion of the piston, and the radially inner portion of such piston can transmit torque directly to the turbine or to the rotary input element of a transmission, which receives torque from the turbine or a driven hub which is separably connected to the turbine.

2. Description of Related Art

Under the current state of the art, the connection between the output element of the torsion damper and the hub driven by the turbine is either made by mating internal and external splines or as a riveted joint. This has the inherent disadvantages of the rather expensive and time consuming manufacturing processes required to machine the mating splines and/or requires numerous component parts and/or other fasteners and related labor costs to install the damper in the torque converter.

Hydrokinetic torque converters of the above-outlined character are disclosed, for example, in U.S. Pat. Nos. 5,029,087 and 4,577,737 recited herein, and also disclosed in U.S. Pat. No. 5,752,894, which is commonly owned and incorporated herein by reference.

SUMMARY OF THE INVENTION

Accordingly, the present invention provides an improved apparatus and method for assembly of a hydrokinetic torque converter comprising a hydraulic pump, a turbine a stator, and a housing which is driven by the output element of an engine of a motor vehicle and serves to transmit torque to the hydraulic pump. The housing is coaxial with the pump and the turbine and defines an interior chamber, which accommodates the turbine as well as a bypass or lockup clutch cooperating with a torsion damper including an input member and an output member. In the conventional practice, the connection between the output member of the torsion damper and the hub driven by the turbine is made by mating internal and external splines and/or as a riveted joint.

The present invention provides an improved apparatus and method for interlocking the output member of the torsion damper with the driven hub of the turbine by utilizing a metal staking process in combination with a circumferential serration formed on the output member to form a fixed, non-rotatable connection therebetween.

Thus, the inherently expensive and complex manufacturing processes for such splined components and other related components and/or fasteners are significantly reduced or eliminated. In addition, other related components of the torque converter cooperating with the torsion damper have been integrated into single components to reduce the space requirements of the torque transmitting apparatus.

In view of the above, it is an object of the present invention to provide useful improvements in a hydrokinetic torque converter and in the assembly methods thereof in which a metal staking process in combination with a circumferential serration formed in such output member are utilized to form a non-rotatable axial connection between the driven hub of the turbine and the output member of the torsion damper.

Another object of the present invention is to provide an improved hydrokinetic torque converter in light of the described state of the art, which in contrast to the state of the art, is relatively less complex mechanically, requires fewer manufacturing and machining processes, and as a result is less expensive to manufacture and assemble.

Another object of the invention is to create a torque converter, which is more compact as the result of having fewer component parts and/or multiple parts integrated into a single component having reduced space requirements.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
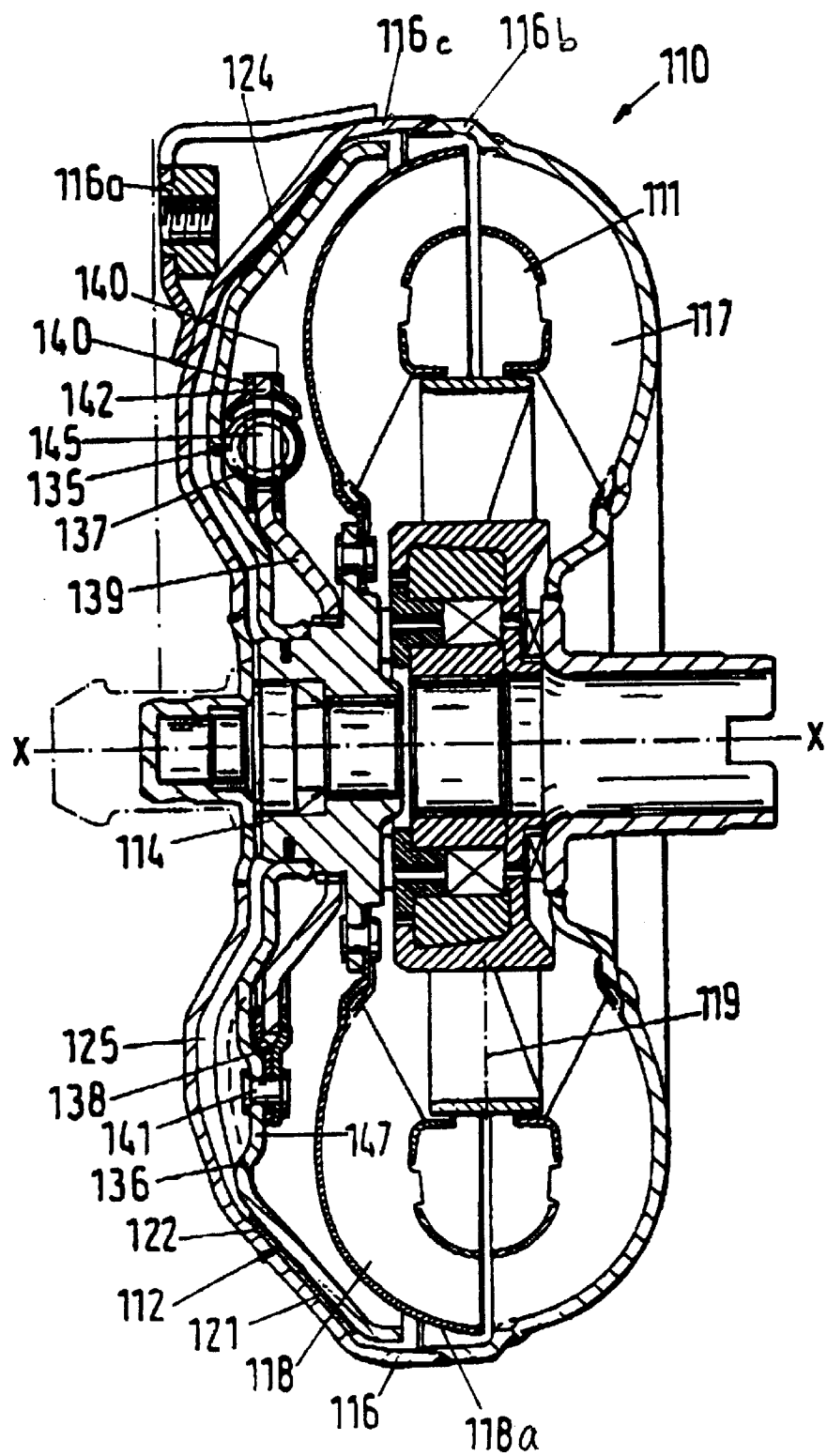
FIG. 1 is a fragmentary schematic partly elevational and partly axial sectional view of a torque transmitting apparatus labeled PRIOR ART employing a hydrokinetic torque converter and a bypass clutch wherein the present invention is to be utilized.

Prior to describing the improvements of the present invention in detail, it may be beneficial to review the structure and function of a hydrokinetic torque converter with which the apparatus and method of present invention are to be utilized. Referring to FIG. 1 there is shown therein a torque transmitting apparatus, indicated generally at 110 and labeled PRIOR ART, comprising a hydrokinetic torque converter 111, which is an integral part of the power train of a motor vehicle (not shown) having an engine and a transmission wherein the transmission is preferably a continuously variable transmission (CVT). Such a continuously variable transmission is disclosed in commonly owned U.S. Pat. No. 5,879,253.

The torque converter 111 includes a bypass clutch 112 and a damper 135 which is installed between the clutch 112 and the hub 114 of the turbine 118 forming part of the torque converter. The turbine 118 is mechanically attached to the hub 114 at a radially inner portion of the turbine cover 118a by rivets 141. The torque converter 111 further comprises a housing 116 which is driven by the engine (not shown) of a motor vehicle by way of fasteners 116a and drives the impeller or hydraulic pump 117 residing therein. Housing 116 is comprised of two interconnected covers 116b and 116c which are mechanically coupled, for example, by weldment to prevent rotation thereof and are joined together in a fluid-tight attachment. The fasteners 116a (only one shown in FIG. 1) function to secure the housing 116 of the torque converter 111 to a disc (not shown) on the rotary output element (e.g. the crankshaft) of the combustion engine.

The stator 119 of the torque converter 111 is installed between the pump 117 and the turbine 118 in fluid communication therewith forming a closed toroidal fluid flow circuit driven by the pump 117, which is attached to the rotary output element of the engine.

Still referring to FIG. 1, the bypass clutch 112 comprises an annular piston 136 whose axis coincides with the axis X—X of the torque converter 111 and which is installed between the housing 116 and the turbine 118. The bypass or lockup clutch 112 can be of the single plate or multiplate type as explained hereinafter in further detail.

The piston 136 is preferably constructed of sheet metal and its radially inner portion is non-rotatably but axially movably mounted on the hub 114 of the turbine 118. The radially outer portion of the piston 136 constitutes a conical frustum and is provided with a friction lining 121 having an exposed friction surface 122 on the adjacent frustoconical portion of the housing 116.

The piston 136 is disposed between a compartment 124 and a compartment 125 forming part of the enclosure of the housing 116. The compartment 124 is disposed between the piston 136 and the turbine 118, and the compartment 125 is disposed between the piston 136 and the housing 116. The means for changing the axial position of the piston 136 includes means for varying the pressure of fluid in the compartment 125, namely for varying the differential between the pressures of the fluids in the compartments 124 and 125. The magnitude of the torque, which is being transmitted by the bypass clutch 112, is a function of such pressure differential.

The bypass clutch 112 serves merely to operate with slip in order to compensate for peaks of oscillations of the torque that is being transmitted by the output element of the engine. To this end the operation of the bypass clutch 112 within the main driving range of the motor vehicle is regulated in such a way that the maximum torque which can be transmitted via the bypass clutch 112 is a relatively small fraction of the nominal torque of the engine, but the maximum torque which the bypass clutch 112 can transmit is larger than the torque actually being transmitted by the engine to the housing 116 of the torque converter 111.

The construction and mounting of the damper 135 are such that the torque capacity of the damper is less than the nominal torque of the combustion engine, which drives the housing 116. In other words, the damper 135 begins to act like a solid body when the magnitude of the torque transmitted by the bypass clutch 112 is still less than the maximum torque which the engine can transmit to the housing 116 of the torque converter 111.

Stated differently, the input member 138 of the damper 135 ceases to move relative to the flange-like output member 139 of the damper before the magnitude of the torque which is being transmitted to the housing 116 by the combustion engine of the vehicle in which the torque transmitting apparatus is installed reaches a maximum value. This can be achieved in a number of different ways. For example, the convolutions of the coil springs 137 forming part of the damper 135 can be caused to fully abut each other so that the springs 137 act like one-piece solid bodies, or the input and output members 138, 139 of the damper 135 can be provided with stops which come into abutment with each other before the magnitude of the torque being transmitted to the housing 116 reaches a maximum value.

Figure 2:
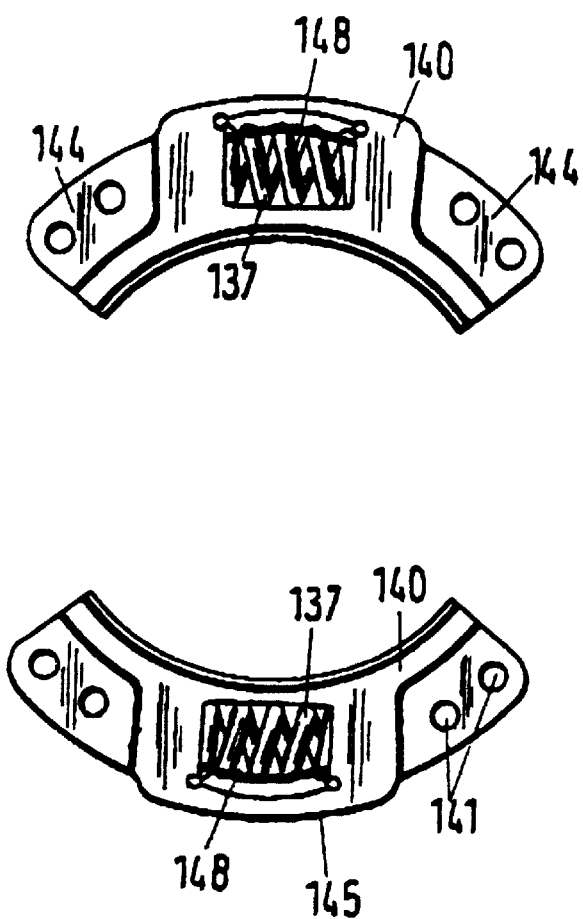
FIG. 2 is a partial exploded elevational view of the input member of the PRIOR ART torsion damper which is shown in FIG. 1.
Figure 3:
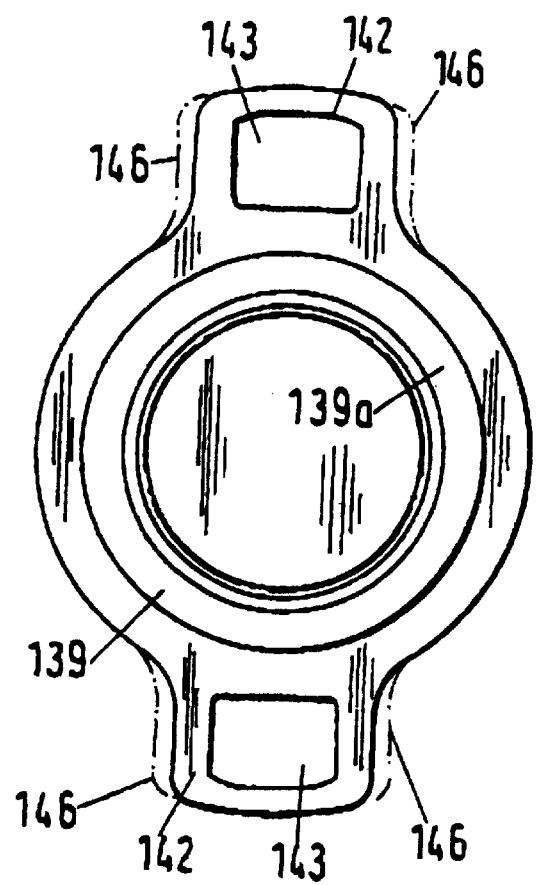
FIG. 3 is an elevational view of the output member of the PRIOR ART torsion damper which is shown in FIG. 1.

In the torque converter 111 of the prior art, the input member 138 of the damper 135 is non-rotatably secured to the piston 136, and the output member 139 of the damper 135 is non-rotatably but axially movably coupled to the hub 114 of the turbine 118. To this end the output member 139 is provided with a set of internal axially parallel teeth mating with complementary axially parallel external teeth of the hub 114. FIGS. 2 and 3 illustrate the details of damper 135, which can be utilized in combination with the bypass or lockup clutch 112.

The elements 137 of the damper 135 prevent the transmission of any oscillations of torque from the output element of the engine to the input shaft of the transmission while the motor vehicle is operated within the main driving range. The damper 135 is provided with an input element 138 and an output element 139 wherein such elements can be rotated relative to each other in a given angular range against the restoring force of the springs 137 captured between them.

The input member 138 of the damper 135 comprises a plurality of segment-shaped sections 140, namely a first pair of sections 140 which confront each other at one side of the axis X—X and a second pair of sections 140 confronting each other at the other side of the axis X—X diametrically opposite the sections 140 of the first pair. The sections 140 of each pair of sections are affixed to the piston 136 by means of one or more rivets 141 and/or other suitable fasteners.

FIG. 3 shows the flange-like output member 139 of the damper 135. This output member comprises an annular main portion 139a which carries two radially outwardly extending arms 142 disposed diametrically opposite each other. The arms 142 have windows 143 for the energy storing elements or springs 137 of the damper 135. Each arm 142 is disposed between a pair of sections 140 as most clearly seen in FIG. 1.

To this end the sections 140 of each pair are provided with confronting pockets 145 jointly defining a receptacle or pocket for the respective arm 142 as seen in FIG. 2. The dimensions of the pockets 145 are selected in such a way that the input and output members 138, 139 of the damper 135 have limited freedom of angular movement relative to each other. This is illustrated in FIG. 3 wherein the two end positions of each of the arms 142 relative to the respective pair of sections 140 are indicated by phantom lines as at 146.

The piston 136 is provided with an annulus of circumferentially spaced-apart axial projections 147 as shown in FIG. 1 which extend toward the turbine 118 and abut circumferentially spaced-apart portions 144 as seen in FIG. 2 of the immediately adjacent sections 140 of the input member 138. The rivets 141 secure the portions 144 of the sections 140 forming part of the input member 138 to the adjacent axial projections 147 of the piston 136.

The median portions of the sections 140 forming part of the input member 138 are provided with windows 148 for the adjacent energy storing elements or springs 137. The windows 148 are in accurate axial alignment with the windows 143 in the arms 142 of the output member 139 and the dimensions of the windows are selected in such a way that the springs 137 are received therein without play, i.e. each spring 137 begins to store energy as soon as the input and output members 138, 139 begin to turn relative to each other, when the arms 142 of the output member 139 begin to leave their central positions in the respective pairs of pockets 145.

Further, it is known to select the dimensions of the springs 137 and/or the dimensions and relative positions of the windows 143 and 148 in such a way that at least one of the energy storing elements or springs 137 is received in the respective windows 143, 148 with at least some clearance. Furthermore, at least one of the elements 137 can be installed in the respective windows 143 and 148 in at least slightly pre-stressed condition. Such expedients render it possible to select the manner in which the elements 137 undergo compression and/or additional compression while the input and output members 138, 139 of the damper 135 turn relative to each other.

The damper 135 can be designed in such a way that the elements 137 can transmit between approximately 40% to 50% of the nominal (maximum) torque of the engine which drives the housing 116 of the torque converter 111. Further, the angular movability of the input and output members 138, 139 of the damper 135 relative to each other can be selected in such a way that it need not exceed a relatively narrow angular range between ±2° to ±8°, preferably between ±3° and ±6°. Thus, the total angular displacement of the input and output members 138, 139 relative to each other (in the clockwise and counterclockwise directions) can be between about 4° and 16° preferably between 6° and 12°.

Such relatively small angular displacement is particularly desirable and advantageous when the operation of a motor vehicle embodying the torque transmitting apparatus is shifted from coasting to pulling a load or vice versa. Relatively small angular displacements of the input and output members 138, 139 of the damper 135 under such circumstances reduces the likelihood of an excessive buildup of resonant vibrations in the power train of the motor vehicle. Any fluctuations of torque beyond the torque capacity of the damper 135 are compensated for in that the friction surfaces of the bypass clutch 112 are caused to slide relative to each other. Thus, the combination of the bypass clutch 112 and the damper 135 is effective within a wide range of operations of a motor vehicle with the torque converter 111 operatively disposed between the engine and the continuously variable transmission.

Figures 4, 5:
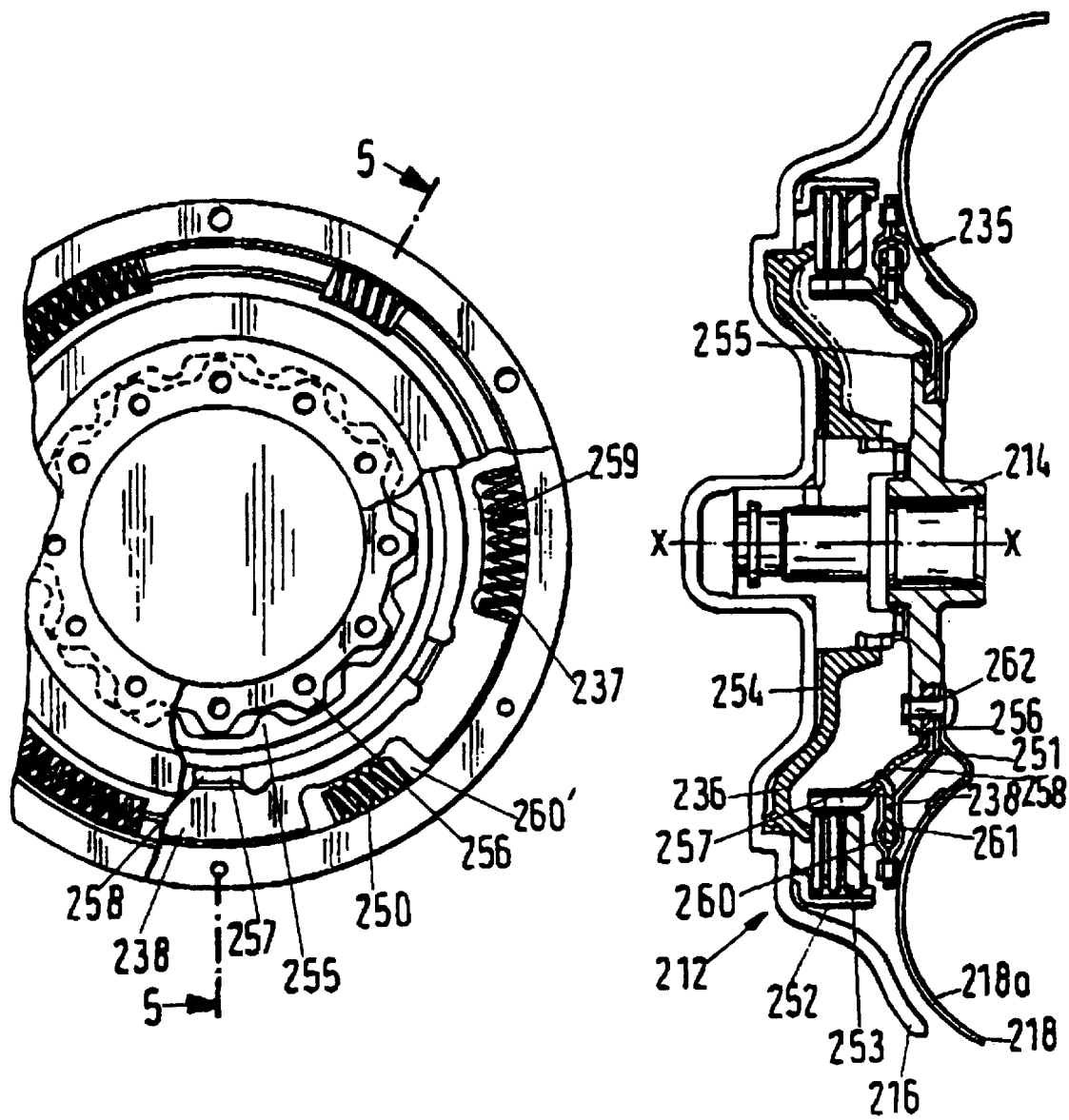
FIG. 4 is a fragmentary elevational view of a multi-stage torsion damper of the PRIOR ART which can be utilized in combination with a lockup clutch in accordance with the present invention.
FIG. 5 is a sectional view taken along the section line 5—5 as indicated by directional arrows in FIG. 4 and labeled PRIOR ART.

FIGS. 4 and 5 illustrate an example of a prior art multiplate lockup clutch, indicated generally at 212, wherein the improvements and method of the present invention can also be utilized. The multiplate lockup clutch 212 is installed in a hydrokinetic torque converter having a housing 216 and a turbine 218 with a hub 214. The lockup clutch 212 comprises a multiple-stage torsional damper 235 having a first set of energy storing elements 237 and a second set of energy storing elements 250. In the embodiment shown, the illustrated energy storing elements 237 and 250 are coil springs.

The illustrated lockup clutch 212 is a multiplate clutch having a radially inner plate carrier 251 and a radially outer plate carrier 252. The latter is non-rotatably affixed to the housing 216 of the hydrokinetic torque converter. That portion of the plate carrier 252, which is nearer to the turbine 218 of the torque converter, supports a plate-like stop 253. The housing 216 of the torque converter and the piston 236 of the lockup clutch 212 define a compartment 254, which constitutes a plenum chamber and can receive a body of hydraulic fluid. The pressure in the compartment 254 determines the magnitude of the torque which is to be transmitted by the lockup clutch 212.

The plate carrier 251 of the multiple-stage damper 235 constitutes the output member of the lockup clutch 212 and its radially inner portion is provided with an annulus of axially parallel teeth 255 mating with clearance with the external teeth 256 provided on the hub 214 of the turbine 218 (i.e. on the output element of the hydrokinetic torque converter). The external teeth 256 are (or can be) provided on a spur gear which is made of sheet metal and is riveted (as at 262) or otherwise non-rotatably affixed to the hub 214.

The multistage damper 235 further comprises an input member 238 which is connected with the aforementioned plate carrier or output member 251 of the lockup clutch 212. The input member 238 of the multistage damper 235 is an annular component which is provided with radially inwardly extending tongues or prongs 257 received in slit-shaped recesses 258 provided in the output member 251 of the lockup clutch 212. The tongues 257 are received in the respective recesses in such a way that they establish a practically clearance-free connection between the output member 238 of the damper 235 (i.e. the parts 238 and 251 are coupled to each other for rotation about the axis X—X of the lockup clutch 212 and the hydrokinetic torque converter including the housing 216 and the turbine 218).

FIG. 4 shows that the input member 238 of the damper 235 is provided with windows 259, 260' for the energy storing elements 237 and 250, respectively. The dimensions of the windows 260' and of the energy storing elements 250 are selected in such a way that the elements 250 are received in the respective windows 260' with clearance in the clockwise and counterclockwise directions. The annular input member 238 is disposed between two discs 260 and 261 of the lockup clutch 212. The discs 260, 261 have confronting cupped portions at the radially outer portion of the input member 238 and are riveted to one another radially outwardly of the member 238 as shown in FIG. 5.

The disc 261 is adjacent the turbine 218 and extends radially inwardly all the way to the hub 214 and is non-rotatably affixed to such hub by the aforementioned rivets 262. FIG. 5 shows that the rivets 262 serve as a means for non-rotatably affixing the disc 261, the gear 256, and the cover 218a of the turbine 218 to the hub 214.

Figures 6, 7:
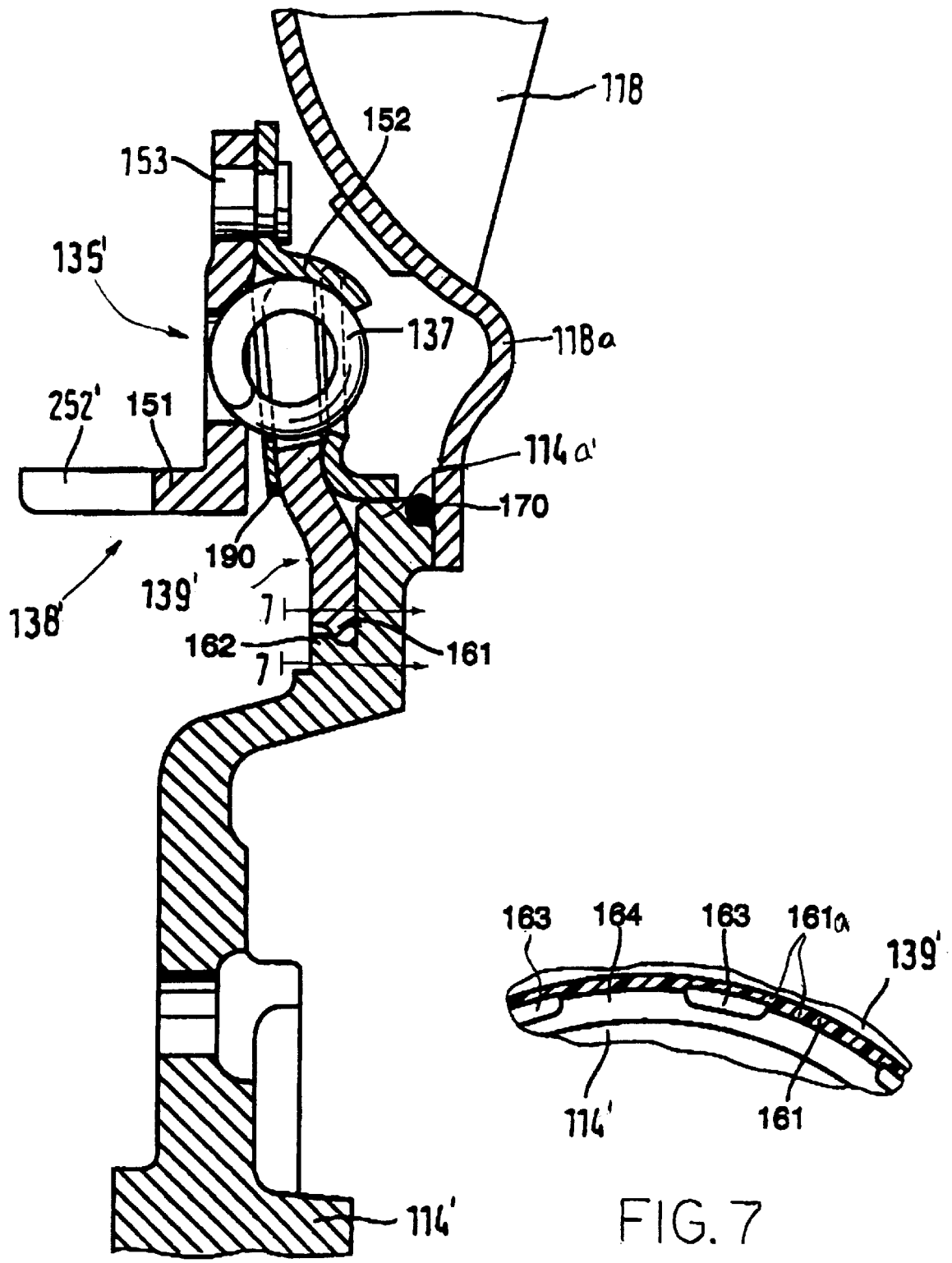
FIG. 6 is a fragmentary axial sectional view of a torsion damper modified in accordance with the present invention.
FIG. 7 is a fragmentary sectional view taken along the section line 7—7 as indicated by directional arrows in FIG. 6 showing details of the present staking method.

Referring to FIGS. 6 and 7 the improved apparatus and method of the present invention will now be described in detail. FIG. 6 shows an enlarged partial view of an improved damper 135' in accordance with the present invention.

In the preferred embodiment, it can be seen that the turbine cover 118a enclosing the turbine 118 is attached to the radially outer portion 114a' of the modified hub 114' by a circumferential weldment as at 170 in lieu of the riveted connection of the prior art described hereinabove and illustrated in FIGS. 1 and 5.

The present damper 135' includes a modified input member, indicated generally at 138', and a modified output member, indicated generally at 139'. The input member 138' is comprised of two sheet metal sections or members 151 and 152, which are arranged in confronting relation and secured at the radially outermost portions thereof as shown in FIG. 6 by a rivet 153 or other suitable fastener. Energy storing elements or springs 137 are disposed between the input member 138' and the output member 139' of the modified damper 135' as shown being aligned in the direction of angular rotation. The output member 139' may also include a diaphragm spring 190 disposed in operative relation to a confronting surface of the section 151 of the input member 138' as seen in FIG. 6.

The modified damper 135' includes structures for providing a positive locking connection between the output member 139' of the damper 135' and the modified hub 114'. Such structures form interlocking means including but not limited to those hereinafter described. Still referring to FIG. 6, the modified output member 139' is constructed as a generally disc-shaped component having a central opening (not shown) substantially conforming in size to the diameter of a shoulder as at 162 formed on the hub 114'. The output member 139' is installed on this shoulder diameter and abuts a radially outer portion 114a' of the modified hub 114' as shown being axially fixed in this position.

Referring now to FIG. 7, a circumferential serration 161 having a plurality of axially projecting teeth 161a is formed in the output member 139' adjacent the periphery of the central opening thereof. In the preferred embodiment the serration 161 is fabricated to predetermined dimensions by a metal stamping process using conventional metal stamping dies and a mechanical and/or hydraulic press.

Since such metal stamping processes are well known to those skilled in the art, further detailed discussion of the same is not deemed necessary.

The output member 139' is secured in non-rotatable engagement with the hub 114' by a metal staking process in accordance with the present invention. In such a metal staking process, the output member 139' is positioned on the mating shoulder diameter of the hub 114' as shown in FIG. 2. This sub-assembly comprised of the output member 139' and the hub 114' is placed in a hydraulic press including a metal staking tool or die (not shown) constructed for this purpose and the shoulder diameter of the hub 114' is staked as at 162 creating raised metal protuberances or segments 163, which are compressed axially against the serration 161 securing output member 139' in position and preventing axial rotation thereof In a preferred staking method, the staked segments 163 are discontinuous being formed in discrete, interrupted segments 163 of a short length alternating with non-staked areas 164 as shown in FIG. 7 to secure the output member 139' in position on the hub 114'. Such a staked connection between the output member 139' and the hub 114' has proven to be of sufficient strength to transmit the nominal torque generated by the engine.

A particular advantage of staking the hub 114' as at 162 in interrupted segments 163 lies in the convenience of interlocking components having large diameters. In such cases a significant amount of pressure is not required as compared to those applications in which such a staking process would be applied to the entire circular diameter.

Using the above-described staking method, a costly and labor-intensive construction of a unitary component (not shown) comprised of the hub 114' and the output member 139' can be avoided. To this end the output member 139' may be constructed by a less expensive metal stamping process and attached to the machined hub 114' utilizing the present staking method. Advantageously, present method permits the hub 114' and the output member 139' to be manufactured as separate components and to be constructed of different materials if desired.

In the embodiment shown in FIG. 6, the input member 138' of the damper 135' is attached to the bypass or lockup clutch, which can be either a single plate clutch (as in bypass clutch 112) or multiplate clutch (as in lockup clutch 212) described hereinabove. If the lockup clutch is composed of multiple plates (as in lockup clutch 212), then the input member 138' of the present damper 135' is comprised of a multiple plate carrier (such as inner plate carrier 251 or outer plate carrier 252) described hereinabove and shown in FIG. 5.

This requires that the plate carriers such as 251, 252 of the prior art be mechanically attached to section 151 of the present input member 138' or that the multiple plate carriers and the section 151 of the present input member 138' be constructed as a single component. To this end, the present invention provides a modified multiple plate carrier 252' as shown in FIG. 6, which is integrally formed with the input member 138' and extending in the axial direction.

In accordance with the present invention, the input member 138' of the damper 135' may include alternative structures for integrating the input member 138' with such a multiplate clutch. Such structures form integrating means including but not limited to those described hereinabove.

Although not specifically illustrated in the drawings, it should be understood that additional equipment and structural components will be provided as necessary and that all of the components above are arranged and supported in an appropriate fashion to form a complete and operative hydrokinetic torque converter incorporating features of the present invention.

It is also understood that variations may be made in the present invention without departing from the scope of the invention. Moreover, although illustrative embodiments of the invention have been described, a latitude of modification, change, and substitution is intended in the foregoing disclosure, and in certain instances some features of the invention will be employed without a corresponding use of other features. Accordingly, it is appropriate the appended claims be construed broadly and in a manner consistent with the scope of invention.

What is claimed is:

1. An improved hydrokinetic torque converter including a hydraulic pump, a turbine, a stator, a driven hub being rotatable about a common axis, and further including a housing driven by an output element of an engine of a motor vehicle, said housing being coaxial with said pump, said turbine, said stator, and said hub and defining an interior chamber wherein said turbine and a bypass clutch having an axially displaceable piston are disposed in operative relation to a torsion damper having an input member and an output member, said input and output members being axially rotatable relative to one another against the restoring force of a plurality of energy storing elements arranged in operative relation therebetween, said improvements comprising:

interlocking means formed between said output member of said torsion damper and said driven hub such that said output member is non-rotatably mounted in a predetermined axial position on a concentric shoulder diameter of said hub.

2. The improved hydrokinetic torque converter of claim 1 wherein said interlocking means includes a circumferential serration having a plurality of axially-oriented teeth formed on said output member around a periphery of a central opening formed therein, said central opening substantially conforming in size to said shoulder diameter and residing thereon.

3. The improved hydrokinetic torque converter of claim 2 wherein said interlocking means further includes a substantially circumferential array of staked areas being formed in said shoulder diameter to compressively engage said serration such that axial rotation of said output member is prevented.

4. The improved hydrokinetic torque converter of claim 3 wherein said circumferential array of said staked areas is discontinuous including non-staked areas alternating with said staked areas.

5. The improved hydrokinetic torque converter of claim 3 wherein said mounting diameter whereon said circumferential array of staked areas is formed at substantially the same radial dimension as the juncture of said turbine with said driven hub.

6. An improved hydrokinetic torque converter including a hydraulic pump, a turbine, a stator, and a driven hub being rotatable about a common axis, and further including a housing driven by an output element of an engine of a motor vehicle, said housing being coaxial with said pump, said turbine, said stator, and said hub and defining an interior chamber wherein said turbine and a multiplate lockup clutch having at least one plate carrier and an axially displaceable piston are disposed in operative relation to a torsion damper having an input member and an output member, said input and output members being axially rotatable relative to one another against the restoring force of a plurality of energy storing elements arranged in operative relation therebetween, said improvements comprising:

interlocking means formed between said output member of said torsion damper and said driven hub such that said output member is non-rotatably mounted in a predetermined axial position on a concentric shoulder diameter of said hub; and means for integrating said input member of said damper with said at least one plate carrier of said multiplate clutch.

7. The improved hydrokinetic torque converter of claim 6 wherein said interlocking means includes a circumferential serration having a plurality of axially-oriented teeth formed on said output member around a periphery of a central opening formed therein, said central opening substantially conforming in size to said shoulder diameter and residing thereon.

8. The improved hydrokinetic torque converter of claim 7 wherein said interlocking means further includes a substantially circumferential array of staked areas formed in said mounting diameter to compressively engage said serration such that axial rotation of said output member is prevented.

9. The improved hydrokinetic torque converter of claim 8 wherein said circumferential array of staked areas is discontinuous including non-staked areas alternating with said staked areas.

10. In a hydrokinetic torque converter including a hydraulic pump, a turbine, a stator, a driven hub being rotatable about a common axis, and further including a housing driven by an output element of an engine of a motor vehicle, said housing being coaxial with said pump, said turbine, said stator, and said hub and defining an interior chamber wherein said turbine and a bypass clutch having an axially displaceable piston are disposed in operative relation to a torsion damper having an input member and an output member, said output member being mounted on a concentric shoulder diameter of said hub, said input and output members being axially rotatable relative to one another against the restoring force of a plurality of energy storing elements arranged in operative relation therebetween, a method of attaching said output member to said shoulder diameter of said hub, said method comprising the steps of:

machining said hub including said shoulder diameter to predetermined dimensions;

fabricating said output member including a central opening substantially conforming to said shoulder diameter;

forming a circumferential serration in said output member in coaxial relation to said central opening;

positioning said output member including said serration onto said shoulder diameter of said hub such that said opening resides on said shoulder diameter; and staking said shoulder diameter such that a circumferential array of raised metal areas are formed for compressive engagement with said serration enabling said output member to be affixed on said hub in non-rotatable relation thereto.

11. The method of claim 10 wherein the step of forming further includes the step of stamping said circumferential serration into said output member.

12. The method of claim 11 wherein the step of stamping is carried out by a metal stamping apparatus.

13. The method of claim 10 wherein the step of staking is carried out by a hydraulic press apparatus.

* * * * *